United States Patent
Frait

(10) Patent No.: US 9,623,857 B2
(45) Date of Patent: Apr. 18, 2017

(54) FRONT MODULE FOR A MODULAR HYBRID TRANSMISSION

(71) Applicant: Ford Global Technologies, LLC, Dearborn, MI (US)

(72) Inventor: Steven Anatole Frait, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 208 days.

(21) Appl. No.: 14/107,502

(22) Filed: Dec. 16, 2013

(65) Prior Publication Data

US 2015/0166050 A1    Jun. 18, 2015

(51) Int. Cl.
*B60W 10/02* (2006.01)
*B60K 6/405* (2007.10)
*B60K 6/48* (2007.10)

(52) U.S. Cl.
CPC ............ *B60W 10/02* (2013.01); *B60K 6/405* (2013.01); *B60K 2006/4825* (2013.01); *B60Y 2304/074* (2013.01); *B60Y 2304/076* (2013.01); *Y02T 10/6252* (2013.01); *Y10S 903/902* (2013.01); *Y10T 477/26* (2015.01)

(58) Field of Classification Search
CPC .......................... B60K 6/405; F16H 57/0476
See application file for complete search history.

(56) References Cited

U.S. PATENT DOCUMENTS

| | | | |
|---|---|---|---|
| 6,176,808 B1* | 1/2001 | Brown | B60K 6/365 180/65.25 |
| 2006/0174624 A1* | 8/2006 | Grabowski | B60K 6/40 60/709 |
| 2010/0242669 A1* | 9/2010 | Komizo et al. | 74/606 R |
| 2012/0061201 A1* | 3/2012 | Isogai et al. | 192/85.01 |
| 2012/0118695 A1 | 5/2012 | Kawashima et al. | |
| 2013/0111891 A1 | 5/2013 | Iwase et al. | |

FOREIGN PATENT DOCUMENTS

JP    2011105192 A    6/2011

* cited by examiner

*Primary Examiner* — Colby M Hansen
(74) *Attorney, Agent, or Firm* — David B. Kelley; Brooks Kushman P.C.

(57) ABSTRACT

A front module housing an electric motor/generator and an engine disconnect clutch for a modular hybrid transmission includes a valve body that houses a hydraulic valve which operates the engine disconnect clutch. The valve body is located at an angle relative to the bottom of the front module, providing fastener clearance for mounting the front module to an internal combustion engine.

13 Claims, 3 Drawing Sheets

FRONT MODULE FOR A MODULAR HYBRID TRANSMISSION

TECHNICAL FIELD

The present disclosure relates to a front module for a modular hybrid transmission.

BACKGROUND

Modular hybrid transmissions are designed such that the transmission gearbox and torque converter (or launch clutch if there is no torque converter) are mostly carryover from a non-hybrid application. A separate assembly housing an engine disconnect clutch and a motor/generator is bolted between an engine and a transmission housing. The assembly housing the engine disconnect clutch and motor/generator may generally be referred to as the front module. A small valve body, that contains a valve and other hardware to control the engine disconnect clutch and any hydraulic fluid flow, protrudes from the front module housing. Typically, the valve body protrudes from the bottom of the housing at a 6 o'clock position.

Large engines, such as V8's, generally have steel oil pans, so no fasteners for mounting the front module (or transmission housing in a non-hybrid application) to the engine are located at the 6 o'clock position. Therefore, the valve body can be located at the 6 o'clock position without interfering with the installation of the front module onto the engine. Engines with structural oil pans (like many V6 engines) however, have fasteners located at the 6 o'clock position. Locating the valve body at the 6 o'clock position in these applications will interfere with the installation of the front module onto the engine.

It would be desirable to provide a front module with a valve body located in a position that will not interfere with the fastener located at the 6 o'clock position on engines having structural oil pans, during the installation of the front module onto the engine.

SUMMARY

In a first illustrative embodiment, a front module for a modular hybrid transmission is provided. The front module is disposed between and engine and a transmission gearbox, and includes a housing that has an engine disconnect clutch and a motor/generator disposed therein. The housing has a periphery that extends about a longitudinal axis defined by the housing, the periphery having a bottom center position. A valve body that contains a valve and other hardware to control the engine disconnect clutch and any hydraulic fluid flow, protrudes from the periphery of the housing. The valve body is located on the periphery of the housing circumferentially from the bottom center position to provide clearance for a fastener that is utilized in mounting the front module to the engine and is located at the bottom center position.

In a second illustrative embodiment, a front module for a modular hybrid transmission is provided. The front module is disposed between and engine and a transmission gearbox, and includes a housing that has an engine disconnect clutch and a motor/generator disposed therein. The engine has a front module mating face that defines a plurality of tapped holes, and the front module has an engine mating face located on a flange of the housing that defines a plurality of through holes. The front module is fixed to the engine when a plurality of fasteners is passed through the plurality of through holes in the front module and is threaded into the plurality of tapped holes in engine. The housing has a periphery that extends about a longitudinal axis defined by the housing, the periphery having a bottom center position. A valve body that contains a valve and other hardware to control the engine disconnect clutch and any hydraulic fluid flow, protrudes from the periphery of the housing. The valve body is located on the periphery of the housing circumferentially from the bottom center position in order to provide clearance for one of the plurality of fasteners that is utilized in mounting the front module to the engine, which located at the bottom center position.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
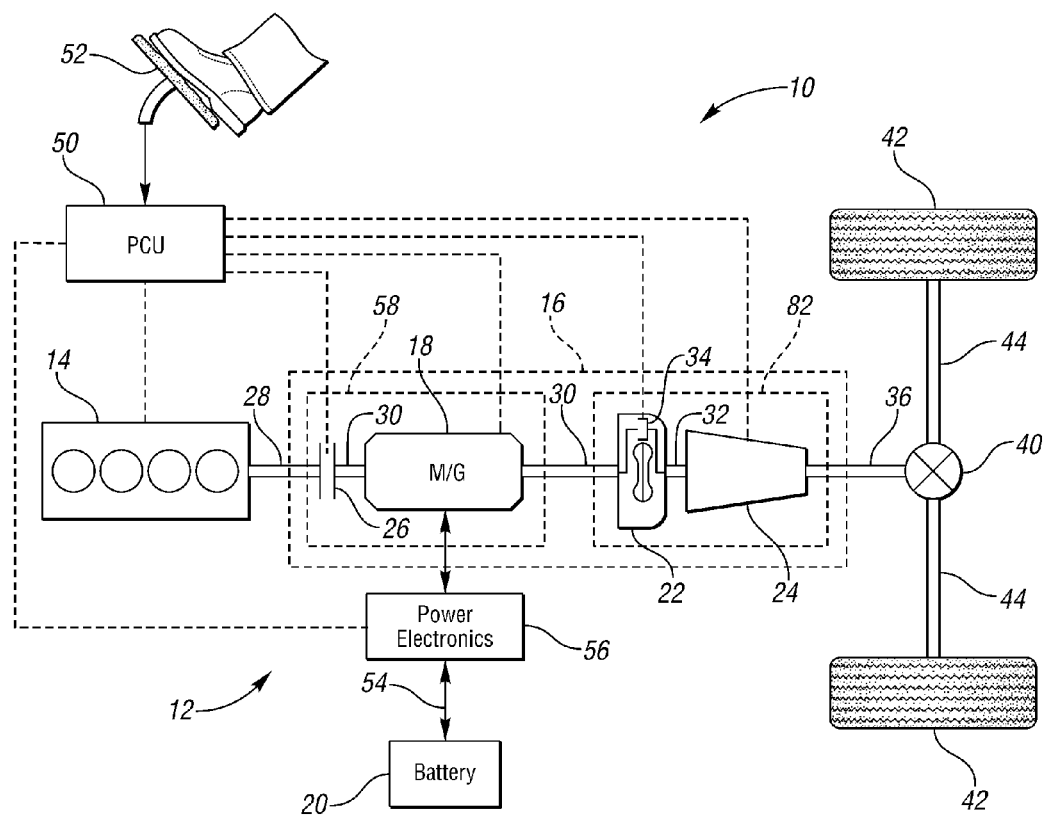
FIG. 1 is a schematic illustration of an exemplary powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when an engine disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics 56 condition direct current (DC) power provided by the battery 20 to the requirements of the M/G 18, as will be described below. For example, power electronics may provide three phase alternating current (AC) to the M/G 18.

When the engine disconnect clutch 26 is at least partially engaged, power flow from the engine 14 to the M/G 18 or from the M/G 18 to the engine 14 is possible. For example, the engine disconnect clutch 26 may be engaged and M/G 18 may operate as a generator to convert rotational energy provided by a crankshaft 28 and M/G shaft 30 into electrical energy to be stored in the battery 20. The engine disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the engine disconnect clutch 26 is at least partially engaged.

The M/G 18 is connected to the torque converter 22 via shaft 30. The torque converter 22 is therefore connected to the engine 14 when the engine disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to the engine disconnect clutch 26 may be provided between the M/G 18 and gearbox 24 for applications that do not include a torque converter 22 or a torque converter bypass clutch 34. In some applications, the engine disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU) 50. The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated powertrain control unit (PCU) 50. While illustrated as one controller, the PCU 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, PCU 50 may communicate signals to and/or from engine 14, engine disconnect clutch 26, M/G 18, launch clutch 34, transmission gearbox 24, and power electronics 56. Although not explicitly illustrated, those of ordinary skill in the art will recognize various functions or components that may be controlled by PCU 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for engine disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by PCU 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as PCU 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the engine disconnect clutch 26 and the torque converter bypass clutch 34. Like the engine disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the engine disconnect clutch 26 is at least partially engaged to transfer at least a portion of the engine torque through the engine disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the engine disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The PCU 50 commands the power electronics 56 to convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the vehicle 10 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28 or an additional motor may be provided to start the engine 14. Other configurations are contemplated without deviating from the scope of the present disclosure.

Figure 2:
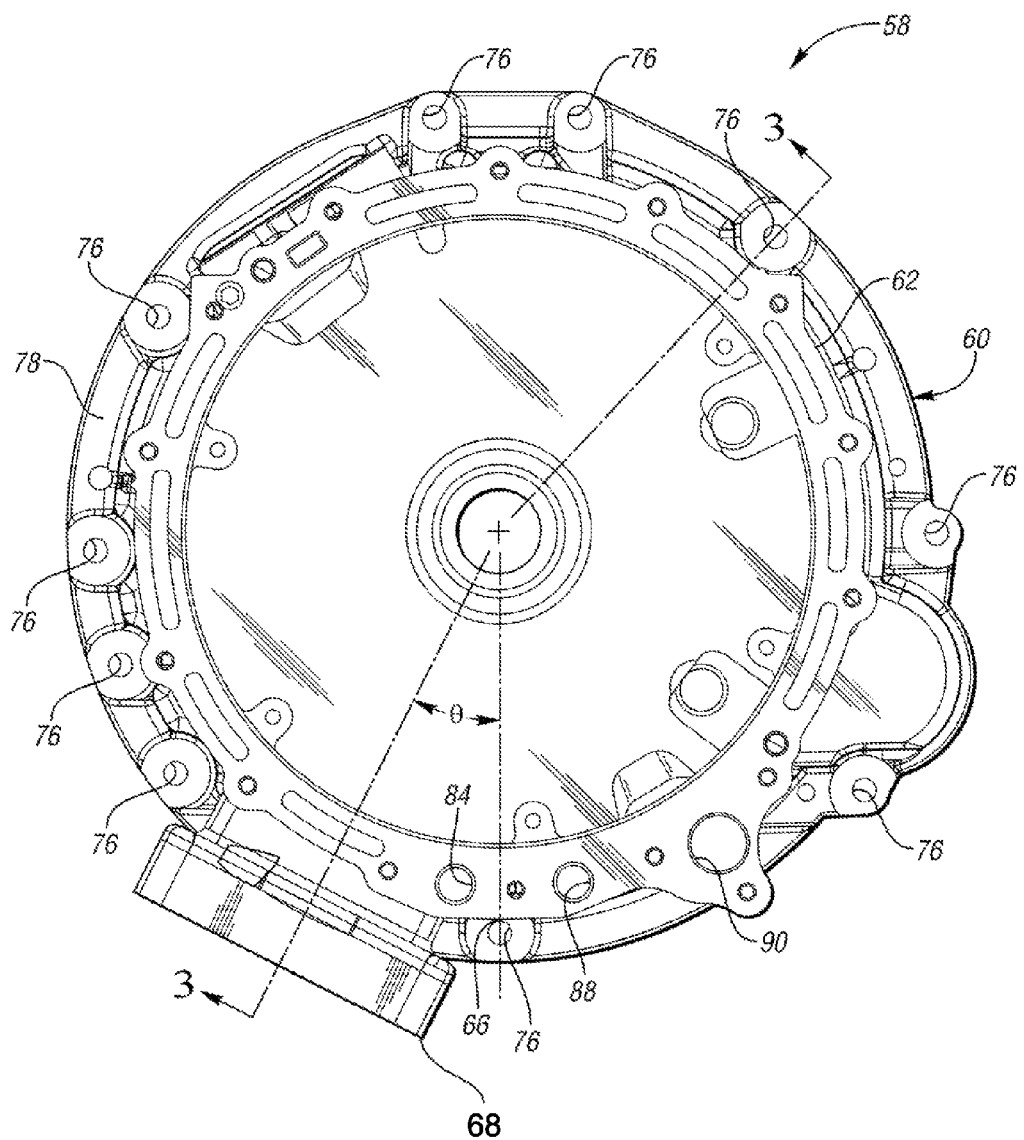
FIG. 2 is a plan view of the front module taken along the line 2-2 of FIG. 3.
Figure 3:
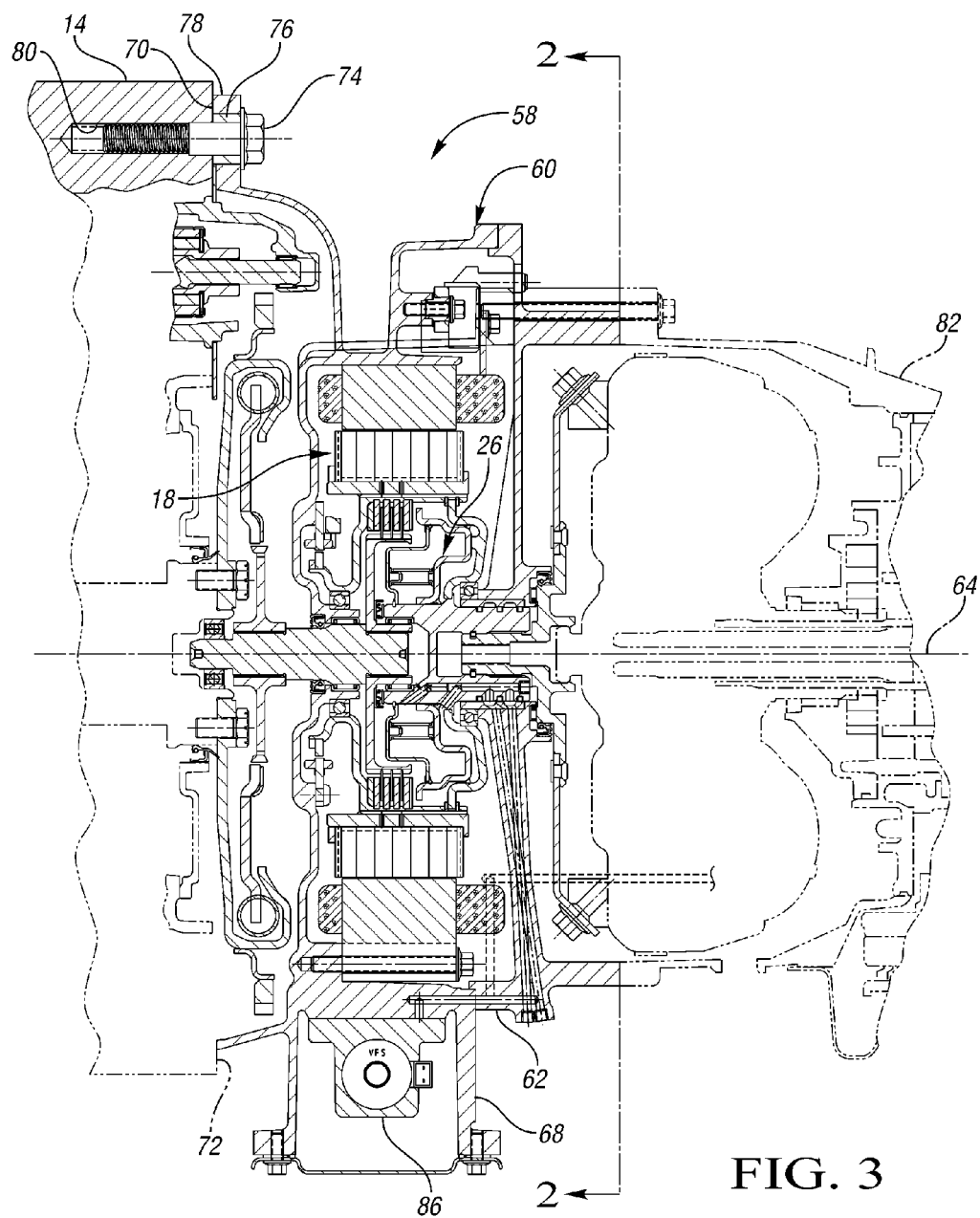
FIG. 3 is a cross-sectional view of the front module taken along the line 3-3 of FIG. 2.

Referring to FIGS. 2 and 3, a front module 58 is disposed between the engine 14 and the transmission gearbox 24. The front module 58 includes a housing 60 that contains the M/G 18 and the engine disconnect clutch 26. The housing 60 of the front module 58 has a periphery 62 that extends about a longitudinal axis 64 that is defined by the housing 60. The periphery 62 has a bottom center position 66 that coincides with the 6 o'clock position of the housing 60 as shown in the plan view of FIG. 2. A valve body 68 is located on the periphery 62 of the housing 60 circumferentially from the bottom center position 66.

The front module 58 includes an engine mating face 70 that coincides with a front module mating face 72 of the engine 14, when the front module 58 has been mounted to the engine 14. The front module is held in place by a plurality of fasteners 74 that pass through a plurality of through holes 76 that extend through a flange 78 of the housing 60. Once the plurality of fasteners 74 has passed through the plurality of through holes 76, they are then threaded into a plurality of tapped holes 80 in the engine 14. The tapped holes extend from the front module mating face 72 into the engine 14.

One of the plurality of fasteners 74 is aligned radially with the bottom center position 66 of the periphery 62. To prevent interference with the fastener located at the bottom center position 66, the valve body 68 is circumferentially located at an angle θ relative to the bottom center position 66. The angle θ may range from 20° to 40°.

Still referring to FIGS. 2 and 3, the front module 58 is connected to a transmission housing 82 on the end opposite of the engine 14. The transmission housing 82 typically houses the transmission gearbox 24 and torque converter 22 (or launch clutch 34 if there is no torque converter). A second plurality of fasteners is utilized to fix the front module 58 to the transmission housing 82. The housing 60 of the front module includes several channels that fluidly communicate with the gearbox 24 of the transmission 16, allowing hydraulic fluid to flow back and forth between the front module 58 and the gearbox 24.

A first channel 84 located in the housing 60 of the front module 58 supplies pressurized hydraulic fluid from the transmission gear box 24 to the front module 58 in order to operate a hydraulic valve 86 that controls (opens and closes) the engine disconnect clutch 26. The hydraulic valve 86 is housed in the valve body 68 of the front module 58, and the hydraulic fluid is pressurized by a pump (not shown) located in the within the transmission housing 82.

A second channel 88 located in the housing 60 of the front module 58 fluidly communicates between the transmission gear box 24 and the front module 58 in order to provide a supply of hydraulic fluid to the front module 58 to cool and lubricate the internal components of the front module 58.

A third channel 90 located in the housing 60 of the front module 58 fluidly communicates between the transmission gear box 24 and the front module 58 allowing hydraulic fluid to flow back into the gearbox 24 from the front module 58.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A module disposed between an engine and a transmission gearbox, comprising:
   a housing with a motor/generator and an engine disconnect clutch disposed therein, the housing defining a longitudinal axis and a periphery extending thereabout, the periphery having a bottom center position; and
   a valve body located on the housing, containing a hydraulic valve which opens and closes the disconnect clutch, and extending outwardly from the periphery at 20° to 40° from the bottom center position.

2. The module of claim 1, wherein the module is fixed to the engine by a plurality of fasteners.

3. The module of claim 2, wherein the housing defines a plurality of through holes, the engine defines a plurality of tapped holes, and the plurality of fasteners fixes the module to the engine when the plurality of fasteners passes through the plurality of through holes and are threaded into the plurality of tapped holes.

4. The module of claim 2, wherein the valve body is located circumferentially from the bottom center position providing clearance for a fastener located at the bottom center position.

5. The module of claim 1, wherein the housing defines a channel that fluidly communicates the transmission gearbox with the hydraulic valve providing a supply of pressurized hydraulic fluid to operate the hydraulic valve.

6. The module of claim 1, wherein the housing defines a channel that fluidly communicates the transmission gearbox with the module providing a supply of hydraulic fluid to cool and lubricate the module.

7. The module of claim 1, wherein the housing defines a channel that fluidly communicates the module with the transmission gearbox allowing a supply of hydraulic fluid to drain from the module into the transmission gearbox.

8. A module disposed between an engine and a transmission gearbox, the engine having a module mating face defining a plurality of tapped holes, comprising:
   a housing with a motor/generator and an engine disconnect clutch disposed therein, the housing defining a longitudinal axis and a periphery extending thereabout, the periphery having a bottom center position, and an engine mating face located on a flange of the housing, the flange defining a plurality of through holes; and
   a valve body located on the housing, containing a hydraulic valve which opens and closes the disconnect clutch, and extending outwardly from the periphery at 20° to 40° from the bottom center position,
   wherein the module is fixed to the engine by a plurality of fasteners when the plurality of fasteners passes through the plurality of through holes and are threaded into the plurality of tapped holes.

9. The module of claim 8, wherein at least one of the plurality of fasteners is aligned radially with the bottom center position.

10. The module of claim 9, wherein the valve body is located circumferentially from the bottom center position providing clearance for the at least one of the plurality of fasteners that is aligned radially with the bottom center position.

11. The module of claim 8, wherein the housing defines a channel that fluidly communicates the transmission gearbox with the hydraulic valve providing a supply of pressurized hydraulic fluid to operate the hydraulic valve.

12. The module of claim 8, wherein the housing defines a channel that fluidly communicates the transmission gearbox with the front module providing a supply of hydraulic fluid to cool and lubricate the front module.

13. The module of claim 8, wherein the housing defines a channel that fluidly communicates the module with the transmission gearbox allowing a supply of hydraulic fluid to drain from the module into the transmission gearbox.

* * * * *